UNITED STATES PATENT OFFICE.

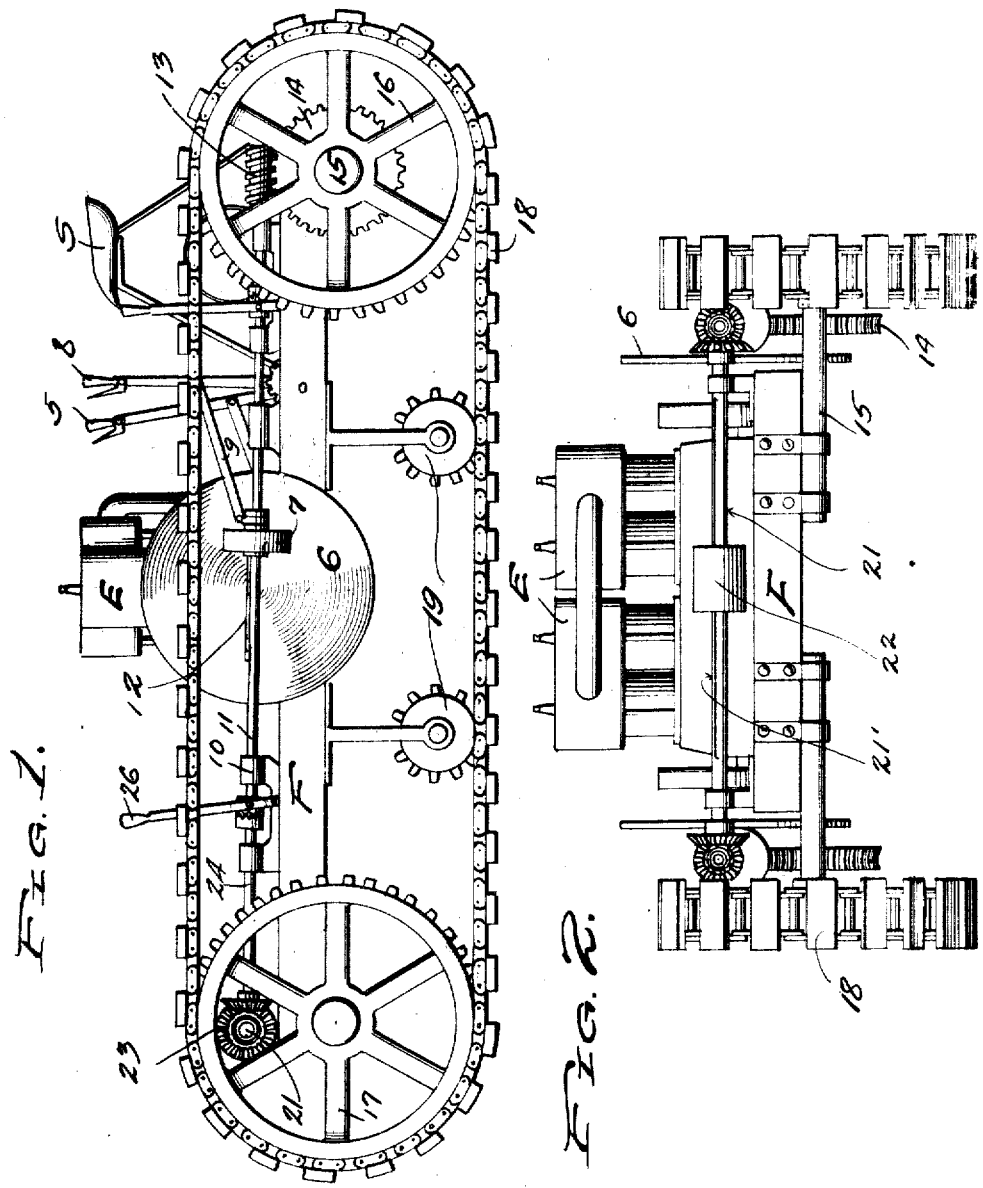

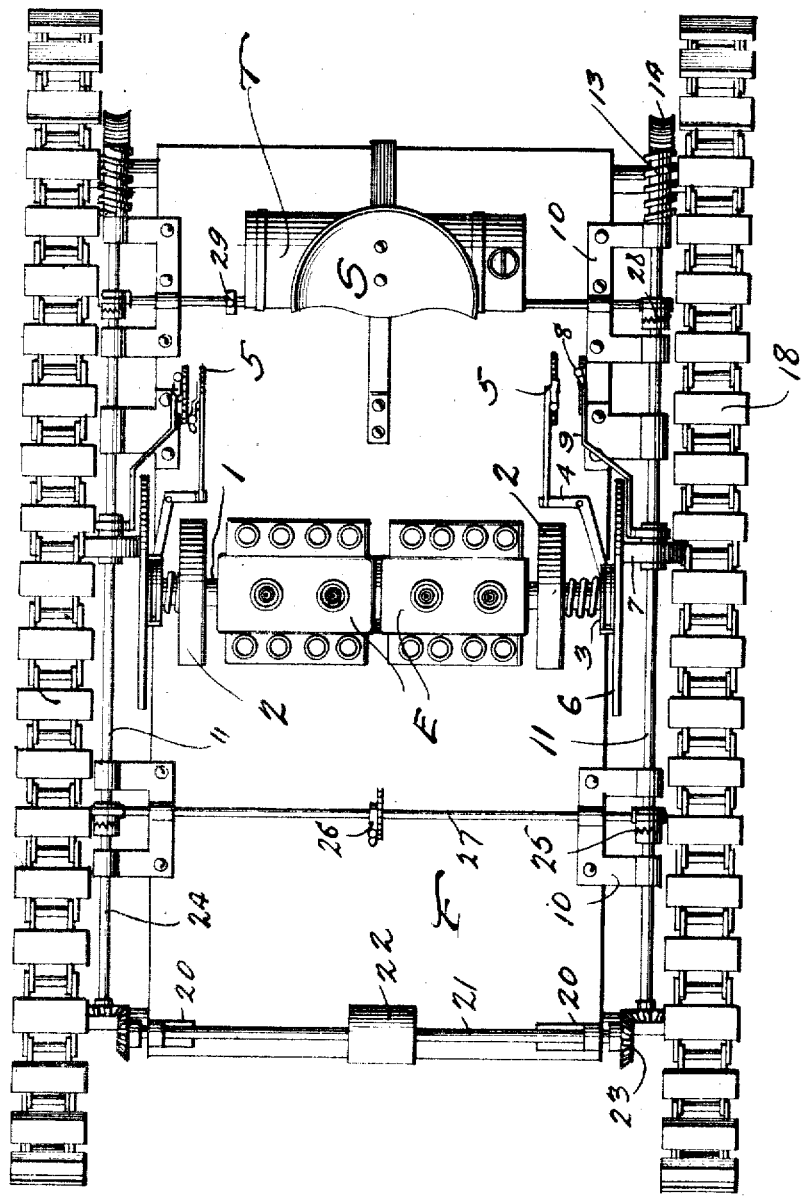
A. N. HAMRICK.
TRACTOR.
APPLICATION FILED DEC. 12, 1918.
1,309,684.
Patented July 15, 1919.
2 SHEETS—SHEET 2.

ALFRED NEWTON HAMRICK, OF CRAWFORD, KANSAS.

TRACTOR.

1,309,684.  Specification of Letters Patent.  Patented July 15, 1919.

Application filed December 12, 1918. Serial No. 266,447.

*To all whom it may concern:*

Be it known that I, ALFRED N. HAMRICK, a citizen of the United States, residing at Crawford, in the county of Rice and State of Kansas, have invented certain new and useful Improvements in Tractors, of which the following is a specification.

This invention relates to gearing for tractors, and more especially to frictional gearing; and the object of the invention is to produce an improved tractor possessing means for driving it along a roadway at the desired speed, for steering it from the driving mechanism, and for cutting out the driving or propelling mechanism and cutting in a jack shaft from which power can be led to a suitable machine, as when the tractor is at rest.

A feature of the present invention lies in the provision of means whereby power is led from the engine to a pair of separate driving axles simultaneously, with controls between the power and the axles so that the machine may be steered. It is even possible to let one driving wheel remain idle or rotate it reversely so that the machine may be turned in very small space. This feature of the invention avoids the necessity for using a movable front axle or movable steering wheels.

Another feature of the invention lies in driving the machine by means of chains led at each side around a rear wheel and the forward wheel so that the grip on the road is amplified and the effectiveness of the tractor as such is increased; and this feature is rendered possible by the omission of mechanism for turning or deflecting the front wheels in the act of steering.

Another feature of the invention is the peculiar mechanism employed for cutting out the driving mechanism and cutting in the power shaft or jack shaft, or the reverse, while still having it possible to drive both shafts when desired.

The details are set forth in the following specification and claims and attention is invited to the drawings, wherein.

Figure 1 is a side elevation of this machine complete,

Fig. 2 is a front elevation and

Fig. 3 is a plan view.

We are not concerned with the details of construction of the frame F and its seat S, nor the engine E and its tank T. The main shaft or crank shaft 1 of the engine stands transversely to the machine and by preference carries two fly wheels 2. Outside of each is a spring-actuated clutch 3 controlled by a bell crank lever 4 connected to a hand lever 5, and there are two of these hand levers within the reach of the driver sitting on the seat.

The clutch establishes connection between the main shaft and a friction disk 6 mounted loosely on the end thereof, and contacting with the outer face of this disk is a friction pulley 7 which is capable of being adjusted along a horizontal line across the center of the disk by means of another hand lever 8 connected by link mechanism 9 with the hub of the pulley, and of these hand levers there are obviously two in reach of a driver on the seat. As is well known, when the pulley stands at the center of the disk, the rotation of the latter is not communicated at all to the pulley: but as the pulley is moved from the center in one direction or the other it is rotated faster and faster and in one direction or the reverse according to that side of the center on which it stands. I am describing but one side of the machine, and the other side is similar.

Mounted in bearings 10 on the frame F is a long power shaft 11 having a feather 12 along which the hub of the pulley 7 slides, and at the rear end of each shaft is a worm 13 engaging a worm wheel 14 which is fastened on a stub axle 15 bearing one of the rear wheels 16. The front wheels 17 are of similar size and similar mounting, and each is connected with its rear wheel by a caterpillar chain 18 the lower stretch of which is held on the ground at appropriate points by idle wheels 19 so that the gripping action of the links of the chain is enhanced.

As thus far described, when the engine is started and both clutches closed, both disks rotate at the same speed, and now when the friction pulleys are set at corresponding points on their respective disks, both main shafts rotate and the worms drive both rear wheels at equal speed. Therefore, the machine progresses forward over the ground. The speed of movement may be reduced by adjusting the pulleys nearer to the centers of the disks. When they are set at the centers their motion ceases. When they are advanced beyond or forward of the centers, they are rotated in the opposite direction and the direction of the movement of the machine is reversed at low speed; and by moving the pulleys yet farther forward their reverse drive is increased as is well known in friction drive machines of this character. Furthermore, it is obvious that by increasing the speed of the left-hand shaft 11 and the left-hand main wheel, this side of the machine will travel forward more rapidly than the other side, and therefore the tractor may be turned around a corner. It is quite possible to drive one side of the machine forward and the other side rearward so that turning in a very small space is effected. Under any conditions, however, movement of one rear wheel is communicated to its corresponding front wheel 17 by the traction or caterpillar chain 18, and therefore the surface engaging the roadway or the earth is considerable.

In appropriate bearings 20 at the front of the frame is mounted a jack shaft 21 feathered at 21' for receiving a pulley 22 from which a belt may lead to a suitable piece of machinery, and each end of the shaft is geared as at 23 to one end of one of the power shafts 11. The gearing connects with a shaft section 24 which is connected with the body of the power shaft by a clutch 25, or in other words a clutch is inserted within the power shaft between the driving pulleys 7 and the bevel gearing 23. The two clutches are actuated by a lever 26 and a suitable connecting rod 27. In similar manner two clutches 28 are inserted between the driving pulleys 7 and worms 14 at the rear ends of the power shafts, and these clutches are actuated simultaneously by the lever 29. When the tractor has reached the point where it is to be used as a power unit, the clutches 28 are opened and the clutches 25 closed. Thereafter either friction disk and its pulley may be employed, or both, but when both are employed they must be driven at the same speed. The power shafts communicate motion through the gearing 23 to the jack shaft, and from the pulley 22 on the latter power can be led to any machine which is to be driven. The fact that the pulley is mounted on a feather on the jack shaft permits it to be adjusted at any point in the length of said shaft so as to be opposite the work on the machine it is driving.

When the tractor is to be driven over the ground, the clutches 25 are opened and the clutches 28 closed and thereafter power communicated from the engine through the friction gearing is applied to the rear portions of the power shafts, and by them to the driving wheels in a manner already described, whereas the front portions or sections 24 of said shafts stand idle. In other words, at this time the rear wheels are separately driven and may be driven at different speeds as explained above, and therefore the invention provides for steering the tractor when it is on the road or in the field without the necessity for the use of a separate steering mechanism.

The foregoing description and accompanying drawings have reference to what might be considered the preferred or approved form of my invention. I desire it to be understood that I may make changes in the construction, combination, and arrangement of parts, materials, dimensions, et cetera, as may prove expedient and fall within the scope of the appended claims.

Having thus fully described my invention what I claim as new and desire to secure by Letters Patent, is:—

1. In a machine of the class described, the combination with a main frame mounted on wheels, power shafts extending along said frame and each divided into front and rear sections with a main section between them, connections between the two shafts and one pair of driving wheels, a jack shaft geared to both front sections, clutches connecting the sections, and manually operable mechanism for actuating said clutches; of a power unit, connections between its main shaft and said power shafts, and means for controlling the direction and speed of power transmitted.

2. In a tractor, the combination with a frame, front and rear wheels independently mounted on separate axles therein, and an engine on said frame; of power shafts mounted along both sides of the frame and driven by said engine, connections between their rear ends and said rear wheels, a jack shaft mounted in bearings across the front portion of said frame, gearing connecting its extremities with the power shafts, clutches within the length of the power shafts connecting their front sections with their rear portions, and manually operated mechanism for actuating said clutches at will.

3. In a tractor, the combination with a frame, front and rear wheels independently mounted on separate axles therein, and caterpillar chains connecting the wheels at each side of the frame; of an engine on said frame, friction disks on both extremities of its shaft, power shafts mounted in bearings on the frame and extending past said disks, worm and worm wheel connections between their rear ends and said rear wheels, friction pulleys on said power shafts, means for adjusting the position of said pulleys independently, a jack shaft mounted in bearings across the front portion of the said frame, gearing connecting its extremities with the power shafts, clutches within the length of the power shafts connecting their front sections with their rear portions, and manually operated mechanism for actuating said clutches at will.

4. In a machine of the class described, the combination with a main frame mounted on wheels, power shafts extending along both sides of said frame and each divided into front and rear sections with a main section between them, connections between the rear sections and the rear driving wheels, a jack shaft geared to both front sections, clutches connecting the sections, and manually operable mechanism for actuating said clutches; of a power unit at the mid-length of the main frame, frictional gearing between its main shaft and said power shafts, and means for controlling the direction and speed of power transmitted.

In testimony whereof I affix my signature in presence of two witnesses.

ALFRED NEWTON HAMRICK.

Witnesses:
E. W. BARRIN,
M. C. SISSON.